United States Patent [19]

Yuhas

[11] Patent Number: 5,159,396
[45] Date of Patent: Oct. 27, 1992

[54] LASER GUN AMMUNITION MEASUREMENT EQUIPMENT

[75] Inventor: Barry J. Yuhas, Pulaski, Tenn.

[73] Assignee: Teledyne Industries, Inc., Los Angeles, Calif.

[21] Appl. No.: 667,313

[22] Filed: Mar. 12, 1991

[51] Int. Cl.$^5$ .............................................. G01C 3/08
[52] U.S. Cl. ................................ 356/28.5; 356/28; 342/67; 342/104
[58] Field of Search ................ 356/28, 28.5; 342/67, 342/104

[56] References Cited

U.S. PATENT DOCUMENTS

| | | |
|---|---|---|
| 2,691,761 | 10/1954 | Smith, Jr. . |
| 2,735,981 | 2/1956 | Schutz et al. . |
| 3,409,369 | 11/1968 | Bickel ................................ 356/28 |
| 3,790,278 | 2/1974 | Buczek et al. ..................... 356/28 |
| 3,918,061 | 11/1975 | Elgaard . |
| 4,167,329 | 9/1979 | Jelalian et al. ..................... 356/5 |
| 4,283,989 | 8/1981 | Toulios et al. . |
| 4,457,206 | 7/1984 | Toulios et al. . |
| 4,486,710 | 12/1984 | Schmidt . |
| 4,622,554 | 11/1986 | Gellekink et al. .................. 342/67 |

Primary Examiner—Mark Hellner
Attorney, Agent, or Firm—Beveridge, DeGrandi & Weilacher

[57] ABSTRACT

An apparatus is described for measuring the velocity of an object by measuring the Doppler frequency shift of a reflected laser beam. A laser beam is projected onto a target area which is moving with respect to the inertial frame of the laser transmitter and the laser receiver. The reflected laser energy is mixed with a local oscillator beam and the mixed beam is focused onto a radiation detector. The Doppler frequency shift is measured, thus indicating the object's velocity. A sacrificial mirror is employed so that internal projectile velocity measurements may be made on the projectile. The laser beam permits measurement both external and internal to the barrel for large and small caliber weapons. Additionally, integration and differentiation means may be provided so that instantaneous position and acceleration data can also be generated for the projectile.

59 Claims, 6 Drawing Sheets

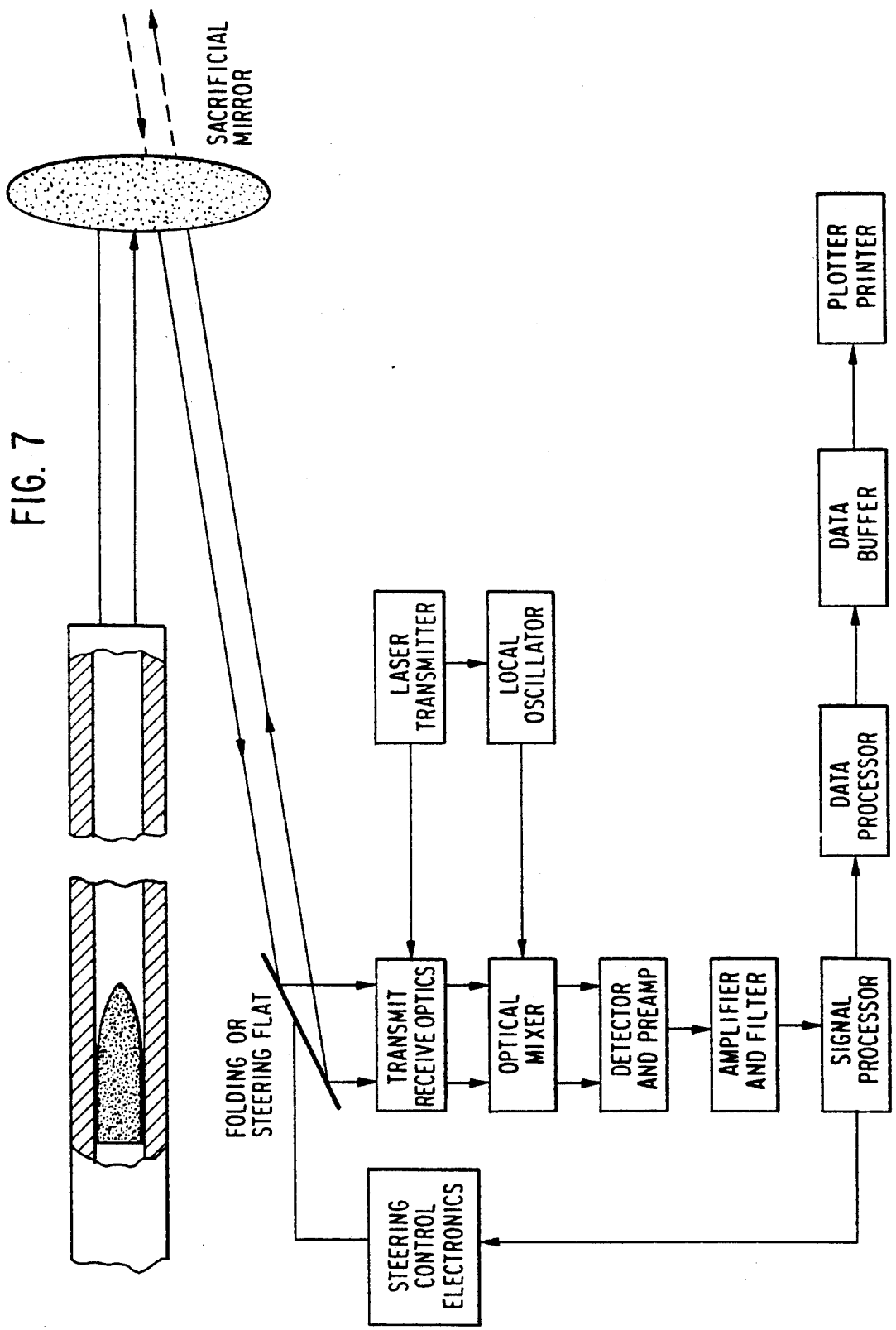

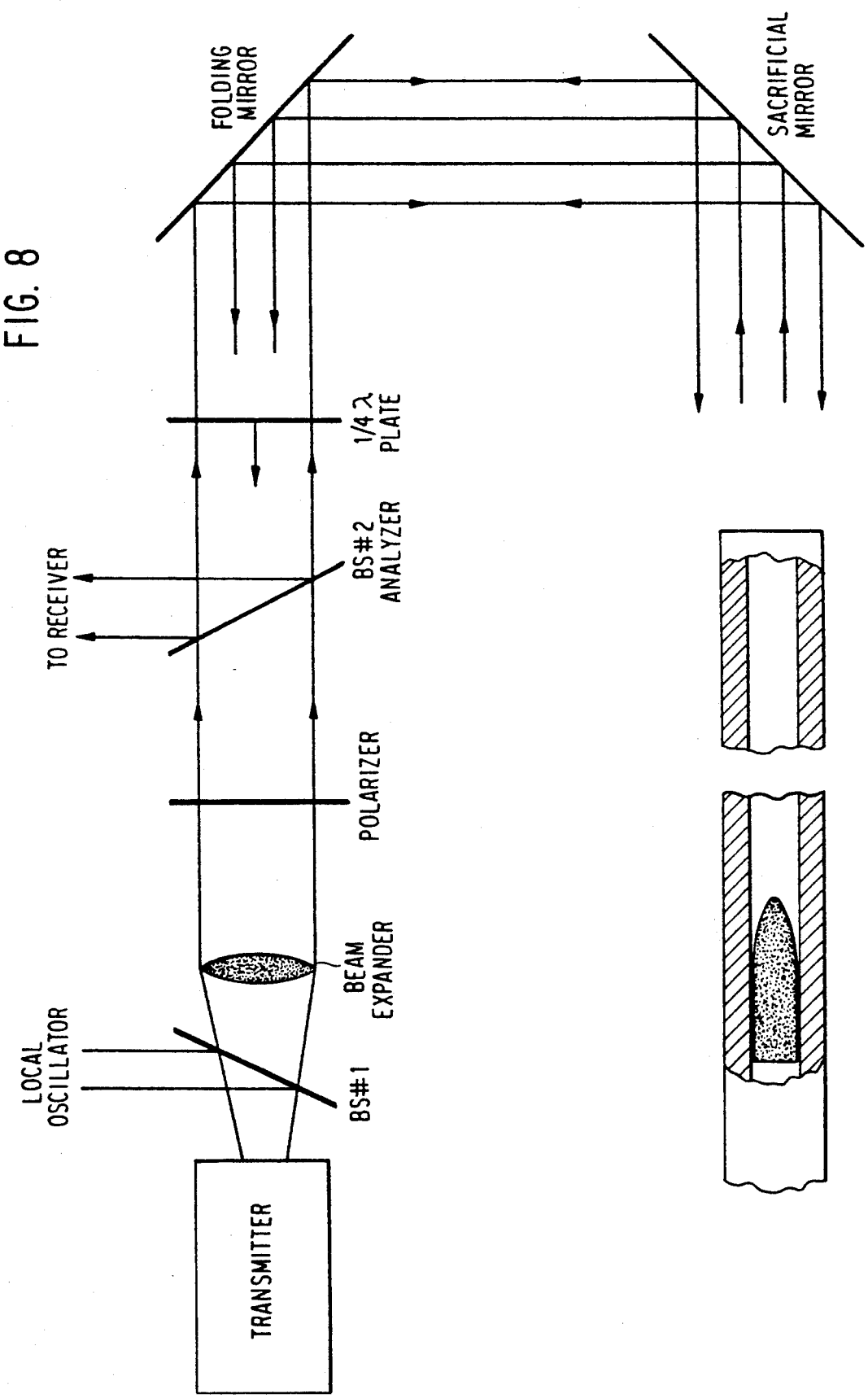

LASER GUN AMMUNITION MEASUREMENT EQUIPMENT

BACKGROUND OF THE INVENTION

This Laser Gun Ammunition Measurement Equipment (Laser GAME) relates to an apparatus for measuring the velocity of a projectile, for example, a bullet shot from a gun, while it is in the gun barrel and/or while it is traveling outside of the gun barrel. This invention utilizes the phenomena of Doppler frequency shifting of the laser light reflected from the projectile as a measure of the velocity of the projectile. Likewise, by providing an appropriate means for integrating and differentiating the velocity data so generated, the instantaneous position and the instantaneous acceleration of the projectile can also be determined.

Several attempts have been made to provide an apparatus which can accurately measure the velocity of a projectile, both while it is within the gun barrel, and after it has cleared the muzzle of the weapon.

Ballistic performance is measured by both passive optical and active microwave devices. Such passive optical devices are known as sky screen devices and light boxes. These optical devices are used to provide a measure of average velocity between specific survey points by measuring the time required for the projectile to traverse a predetermined distance. The microwave devices include radar equipment with the associate radar transmitter, radar receiver and radar signal processor. A recent development is an x-band radar which detects the ballistics velocities with conventional Continuous Wave (CW) radar, operating at 10 GHz. The Doppler radar provides instantaneous velocities with some inhereal Continuous Wave (CW) radar, operating at 10 GHz. The Doppler radar provides instantaneous velocities with some inherent limitations. Both the optical and microwave devices are capable of evaluating the ballistics after the projectiles leave the gun muzzle. This will be referred to as "external ballistics", meaning external to the gun barrel. The microwave devices are also capable of measuring ballistics internal to the gun barrel, i.e. internal ballistics. Several factors limit the performance of these systems for both external and internal ballistics measurements.

Since conventional passive optical techniques for ballistics velocity measurements are limited to external evaluation of average velocity between predetermined (survey) points, the necessity of locating sky screens (outdoor range) or light boxes (indoor range) at various survey points limits the number of measurements which may be taken to the number of pairs of test stations (screens or boxes). The velocity measured is actually an average velocity defined by the distance between survey points covered over some measured time interval. The resolution of the velocity measurement increases with an increasing number of test stations; however, increasing the number of test stations reduces the accuracy of the velocity measurement because of limitations in the ability to accurately measure the time intervals between ever decreasing distances. The result is that the measurement resolution varies inversely with accuracy. Furthermore, any ballistic velocity measurement conducted under the sky screen/light box approach, is limited to the evaluation of average velocity valid only between the test stations. Half of the time the actual projectile velocity is greater than the average velocity, and half the time the projectile velocity is less than the average. The utility of the average velocity measurement must be determined by the user. It may be valid as a measure of the repeatability of a weapon or ballistic; however, it may not be valid for ballistic performance at a point which is outside of the interval of measurement, nor for evaluating rapidly evolving ballistics, within the measurement interval.

Recently, the use of microwave radar for ballistic measurements has been used to attempt to overcome the shortcomings of average velocity measurements made with the sky screens/light boxes of the passive optical type. The microwave radar uses X-band transmitters (nominally at 10 GHz) to illuminate ballistic targets, from a near tail-on aspect, and then the radar receiver collects the frequency shifted, reflected energy. This frequency shifted, reflected power is known as the "Doppler return". The Doppler return is mixed with a local oscillator and detected in the radar receiver. The results of mixing the return power with that of the local oscillator give rise to additional frequencies, commonly referred to as the sum and difference frequencies. However, only the difference frequency is of interest, since it is within the electronic bandwidth of the radar receiver's detector. This Doppler frequency shift gives a direct measure of the projectile velocity and is evaluated by means of a detector and a signal processor.

External ballistics measurements utilizing the microwave radar permits measurement of the projectile velocity through continuous wave (CW) Doppler radar techniques. However, the radar is inadequate for measuring velocities near the muzzle due to the opacity of the fire ball and persistence of the resulting plasma. The X-band (10 GHz) measurement is also suited only for larger caliber ballistics, since the target radar cross section becomes a highly random parameter as the projectile dimension approaches the wavelength of the incident electromagnetic energy beam. Microwave radiation has a wavelength in the range of 10 mm to 3 meters. At 10 GHz the wavelength is approximately 30 mm. For target dimensions near or below 30 mm (such as the projectile diameter), the X-band radar is simply not well suited for making projectile velocity measurements.

In addition, the above microwave methods are not totally compatible with measuring ballistics of a projectile while it is in the gun barrel. When the barrel diameter is approximately equal to the wavelength, the barrel acts as a waveguide, and as the projectile moves through the barrel, it tunes the cavity, resulting in a series of standing wave patterns. A detector then detects the serial maximum and minimum patterns as the projectile accelerates down the barrel. This measurement technique resembles the stationary light boxes of the passive optical art, since the standing wave patterns give rise to a discrete number of measurements as the projectile moves down the barrel. The waveguide nature of these measurements are dependent on a barrel diameter to wavelength relationship and a repeatable transmitter and barrel geometry.

Several U.S. patents describe the measurement of projectile velocity either within or outside of a gun barrel.

Smith, in U.S. Pat. No. 2,691,761, describes a system for measuring internal gun ballistics (within the gun barrel) using a microwave transmitter. The system of Smith requires a substantial amount of modification to the gun barrel. Furthermore, the system of Smith requires tuning of the microwave pattern and cleaning of the gun barrel after each round is fired. These features of the system make its use very inconvenient.

Schultz et al., U.S. Pat. No. 2,735,981, describes another microwave transmitter system used to measure the projectile velocity while in the gun barrel. Again, tuning of the standing wave is required. Also, Schultz employs an expendable microwave element which must be replaced between shots. This adds considerably to the cost and complexity of using this apparatus.

Elgaard, U.S. Pat. No. 3,918,061, shows a system for measuring projectile velocity external to the gun barrel. This system uses a microwave radar source and detects the Doppler return signal. However, microwave wavelengths are strongly attenuated by the plasma and also by the by-products of the burning propellant (Rayleigh scattering). The persistence and density of both the plasma and the neutral particles which emanate from the barrel, adversely effect the transmission of the radar. Accordingly, measurements of the projectile velocity very near the muzzle are not possible with this system. It is also not possible to make internal ballistic measurements with the system of Elgaard.

Toulios et al., in U.S. Pat. Nos. 4,283,989 and 4,457,206 show a microwave system for measuring projectile velocities both internal and external to the barrel. The microwave sources require tuning of the standing waves, as noted above. Also, the system of Toulios requires non-trivial modification of the gun barrel. Additionally, as noted above, microwave wavelengths are significantly limited in their ability to propagate through the plasma and by-products of the burning propellant. Furthermore, microwave radar emits a broad angular beam, and this beam may be unintentionally intercepted or detected by another party in a combat situation. This broad beam also increases the probability of cross-talk between closely spaced units.

Schmidt, U.S. Pat. No. 4,486,710, shows a coil attachment to the gun barrel which makes a single measurement of the velocity of the projectile within the gun barrel. No external measurements are possible. Again, significant barrel modifications are required.

All of the above-mentioned patent documents, and any patent document mentioned hereafter are entirely incorporated herein by reference.

SUMMARY OF THE INVENTION

It is one objective of this invention to overcome the above-mentioned disadvantages of the known projectile velocity measuring devices, and to provide a Doppler frequency projectile velocity measuring apparatus.

This invention employs a laser beam as the light source, preferably a $CO_2$ laser which transmits a coherent laser beam at infrared wavelengths. The use of the laser beam source provides several advantages over the microwave systems. First of all, since the laser source is much less divergent than the microwave radar source, the probability of second party detection of the laser beam is reduced. This reduced probability of intercept greatly enhances the use of this measuring system in a combat situation, as opposed to the microwave radar system. This well defined laser beam likewise lessens the probability of cross-talk between closely spaced weapon systems.

The Laser GAME system of this invention also requires virtually no barrel modifications. It is not necessary to drill a hole through or mount any hardware on the barrel to accommodate the laser transmitter or receiver. The Laser GAME system may be conveniently located exterior to the gun barrel without the use of any special tools, equipment, or special machining. Of course, in order to facilitate transport and field operation, it may be desirable to permanently mount Laser GAME onto the weapon system. This mounting can be done at a location which does not interfere with normal gun operation.

The Laser GAME is capable of making both internal and external ballistics measurements on the same projectile. Such is accomplished by providing a sacrificial mirror. The sacrificial mirror is located in the projectile's path, and it enables the system to make continuous velocity measurements of the projectile while it is within the gun barrel. After the projectile exits the muzzle, it penetrates and destroys the mirror (hence the term sacrificial), and external projectile velocity measurements may be made without changing the system optics. The sacrificial mirrors used in accordance with this invention are inexpensive and easy to replace.

Optics for the combined internal and external Laser GAME are only slightly different from the internal only, or the external only optical configuration. This is due to the need to focus the energy onto the detector, and the focal lengths of the internal configuration are different from the focal lengths of the external configuration. The compromise in the design for combined internal and external configuration is that the optics employ a focal length which is not optimum for either configuration but will function for the combination.

The use of infrared wavelengths provides additional advantages to the Laser GAME system. In the preferred embodiment, a carbon dioxide ($CO_2$) laser is used, which produces a 10.6 micron wavelength laser beam. As discussed above, when the X-Band microwave wavelengths (30 mm) are about the same order as the gun barrel and projectile dimensions, the microwave oscillator frequency must be carefully selected, and the standing wave must be repeatedly tuned. Additionally, different gun barrel diameters require different oscillator frequencies, and also retuning of the radar source. Infrared wavelengths are considerably shorter by several orders of magnitude than microwaves, (10.6 microns versus 30 mm or nearly four orders of magnitude). The short infrared wavelength allows the apparatus of this invention to be used without the need for waveguide tuning after the system is initially installed. It also permits the investigation of smaller caliber weapons than is available with the microwave devices. There is the possibility of using visible laser light in accordance with this invention, since visible light has an even shorter wavelength than infrared. This approach is limited to high bandwidth photo detectors and visible lasers with a high degree of temporal coherence.

The advantage of the shorter optical wavelengths is that velocity measurements may be made on both large and small projectiles, and both internal and external to the gun barrels. It was mentioned above that X-band radar was only suitable for measurement of projectiles equal to or larger than 30 mm. Laser GAME is capable of making ballistic measurements on these large caliber projectiles as well as on small caliber weapons, for example, down to 17 caliber (4.32 mm). This provides a significant improvement over the microwave radar system.

When the projectile leaves the muzzle, it exists in a short term mixture of burning propellant, combustion by-products, and gaseous plasma. The infrared wavelengths propagate through this medium with less attenuation than the microwave radiation. The reason for this is that the propagation of light is a function of the particle and plasma density in the medium. As the particle and plasma densities decrease with time, the attenuation, which is driven by the particle or plasma spacing, will tend to favor the shorter infrared wavelengths over the longer microwave wavelengths. This is due to the fact that forward scattering favors geometric and Mie scattering, and the laser with its shorter wavelength will fall into the Mie and then the geometric scattering region faster than the longer microwave wavelengths. The terms Rayleigh, Mie and Geometric scattering refer to the ratio of particle size to the wavelength of the electromagnetic energy probing the volume. Rayleigh scattering applies when the wavelength is larger than the particle size; Mie scattering applies when the wavelength is very close to the particle size, and Geometric scattering applies when the wavelength is smaller than the particle size. For the by-products of the burning propellant found near the muzzle, the wavelength to particle size ratios are predominantly in the Geometric and Mie regions for laser wavelength, and in the Rayleigh region for microwave wavelengths. The forward scattering coefficient for Geometric and Mie scattering can be orders of magnitude greater than that of Rayleigh scattering. These issues favor the laser radiation when measurements are made as the projectile exits the muzzle area.

A similar situation exists for the propagation of radiation through a charged particle region, as is likely to exist at the muzzle when the high temperature, high pressure gases exit the gun barrel with the projectile. This charged particle medium, referred to as a plasma, will affect the transmission of the laser and microwaves radiation differently. The ability of radiation to propagate through the plasma is directly related to the plasma density and the radiation wavelength. As the plasma density increases, or as the wavelength increases, the transmission of radiation decreases. For any given plasma density, the shorter wavelength radiation will experience higher transmission than the longer wavelengths. Therefore, laser radiation will propagate through the plasma more readily than the microwave radar, because the laser possesses a shorter wavelength.

The use of laser wavelengths enables ballistic measurements throughout the entire projectile flight regime, including the initial acceleration in the weapon barrel and through its transition at the muzzle where the plasma, fireball and other combustion by-products are released from the barrel. This indicates the advantage that the laser based device has over the microwave radar systems. Laser GAME enables measurement of velocity closer to the gun barrel muzzle than is possible by the microwave art, thus reducing or eliminating the need to extrapolate external measured data back to the muzzle.

The Laser GAME, based on the measurement of the Doppler frequency shift of reflected laser radiation, enables one to make far more velocity measurements than would be practical with the sky screen or light box systems. Laser GAME provides both improved resolution and precision over these systems. The improved resolution enhances the fidelity of the measurements, and the improved precision enhances the accuracy of the derived acceleration and position data.

Laser GAME further is capable of providing projectile aim point correction by measuring the projectile velocity at the muzzle, and sending appropriate data to the weapon fire control computer. The firing control computer adjusts the weapon aim point based on the previous projectile velocity data. This data will improve the fire control solution, minimizing the number of rounds required to accomplish the fire mission.

Laser GAME is based on the measurement of the Doppler frequency shift due to the reflection of a laser beam (carrier frequency) from a projectile. The processed Doppler frequency is directly related to the projectile velocity and carrier frequency. Recording the Doppler frequency provides a measure of the projectile velocity. By varying the sampling time, one can either increase the number of measurement or the measurement precision. Smaller sampling intervals permits a higher number of measurements. Alternatively, one could process a smaller number of measurements, enabling greater measurement precision. These options exist at the discretion of the user.

The data may be collected and processed as needed by the operator so as to provide the appropriate resolution and accuracy. The sampling rate for the measurements may be in excess of 1 million measurements per second; however, this measurement density would provide an enormous amount of data most of which would be unnecessary. It has been found that 10 measurements per millisecond over a 15 millisecond projectile flight, for a total of 150 measurements, will provide adequate resolution and accuracy for most internal ballistic measurement purposes. If greater resolution is required the measurement rate may be increased to 100 or 1000 measurements per millisecond. The measurement rate may be increased theoretically to the maximum limit of two measurement per laser frequency oscillation. For the 10.6 micron laser this would result in 60 tera ($10^{12}$) measurements per second.

For long events, the user may wish to sample only a small fraction of the potential data, i.e., one of every twentieth, fiftieth or hundredth data point, available from the signal processor. This would be done to avoid being overwhelmed by data. Such data processing techniques are known and are within the state of the art.

Laser GAME differs from the other velocity measuring systems because the Laser GAME includes the ability to measure projectile velocity directly from the Doppler. The microwave devices measure the rate of change of the standing waves created by the projectile as it moves down the barrel. This rate of change of standing waves may be robust, but it greatly reduces the fidelity of the measurement, i.e., limited number of measurements and limited precision.

Laser GAME can be incorporated in either a commercial/military Research Development, Test and Evaluation (RDT&E) environment, as well as an Operational and Organization (O&O) environment. This is an indication of the flexibility and utility of the Laser GAME hardware.

BRIEF DESCRIPTION OF THE DRAWINGS

The advantageous aspects of this invention will become readily apparent from the following detailed description when viewed in conjunction with the attached figures, wherein:

FIG. 7 shows an embodiment of the Laser GAME which uses a common path homodyne laser radar; and FIG. 8 shows an optical schematic of the Laser GAME which uses a common path laser radar.

DETAILED DESCRIPTION OF THE INVENTION

The Laser Gun Ammunition Measurement Equipment (GAME) may be used to measure ballistic velocity and to evaluate ballistic position or acceleration both while the projectile is within the gun barrel (internal ballistics) and after the projectile has exited the gun barrel (external ballistics). The Laser GAME system uses the phenomena of the Doppler frequency shift to measure projectile velocity. It is known that a Doppler frequency shift occurs when radiation from a temporally stable (coherent) source of known carrier frequency is reflected from an object which is moving relative to the inertial frame of the transmitter/receiver system. By measuring the frequency shift of the reflected energy with respect to the initial frequency, a measurement of the projectile velocity may be obtained. By integrating the velocity with respect to time by an appropriate integration means, the position of the projectile at a given time t can be predicted, $x(t) = \int \nu(t)dt$. Likewise, by the use of a differentiating means, the instantaneous acceleration can be determined $a(t) = (dv/dt)$.

Once the returned laser energy has been converted into electronic signals, integration and differentiation of the signals can be accomplished by two distinctly different methods. In the first embodiment, operational amplifiers may be used to integrate or differentiate the signals as required. The use of operational amplifiers for this purpose is well known to those skilled in the art. Such op-amps are commercially available from manufacturers such as Plessey, Motorola, Texas Instruments, and others. The op-amp systems are preferred if the user is interested in a reliable and rugged data processor which is cost effective.

In another embodiment, the integration and differentiation of the velocity data is accomplished through the use of computer software known to those skilled in the art. This embodiment requires that the analog electronic signals from the receiver be converted to digital signals by analog to digital converters. The digital data is then processed by the algorithms included in the software. The software is more flexible and can be reprogrammed according to the users needs; however, for this same reason, it is more fragile and can be compromised.

Because of the relatively short wavelength of laser radiation used with the Laser GAME system, namely infrared (or visible) wavelengths, the same Laser GAME can be used with both small and large caliber weapons. No modifications are needed to the Laser GAME system when the weapon is changed, and no unique alignment system is needed for either the large or small caliber weapons. Furthermore, the Laser GAME is capable of making both internal and external ballistic measurements on either large or small projectiles.

Figure 1:
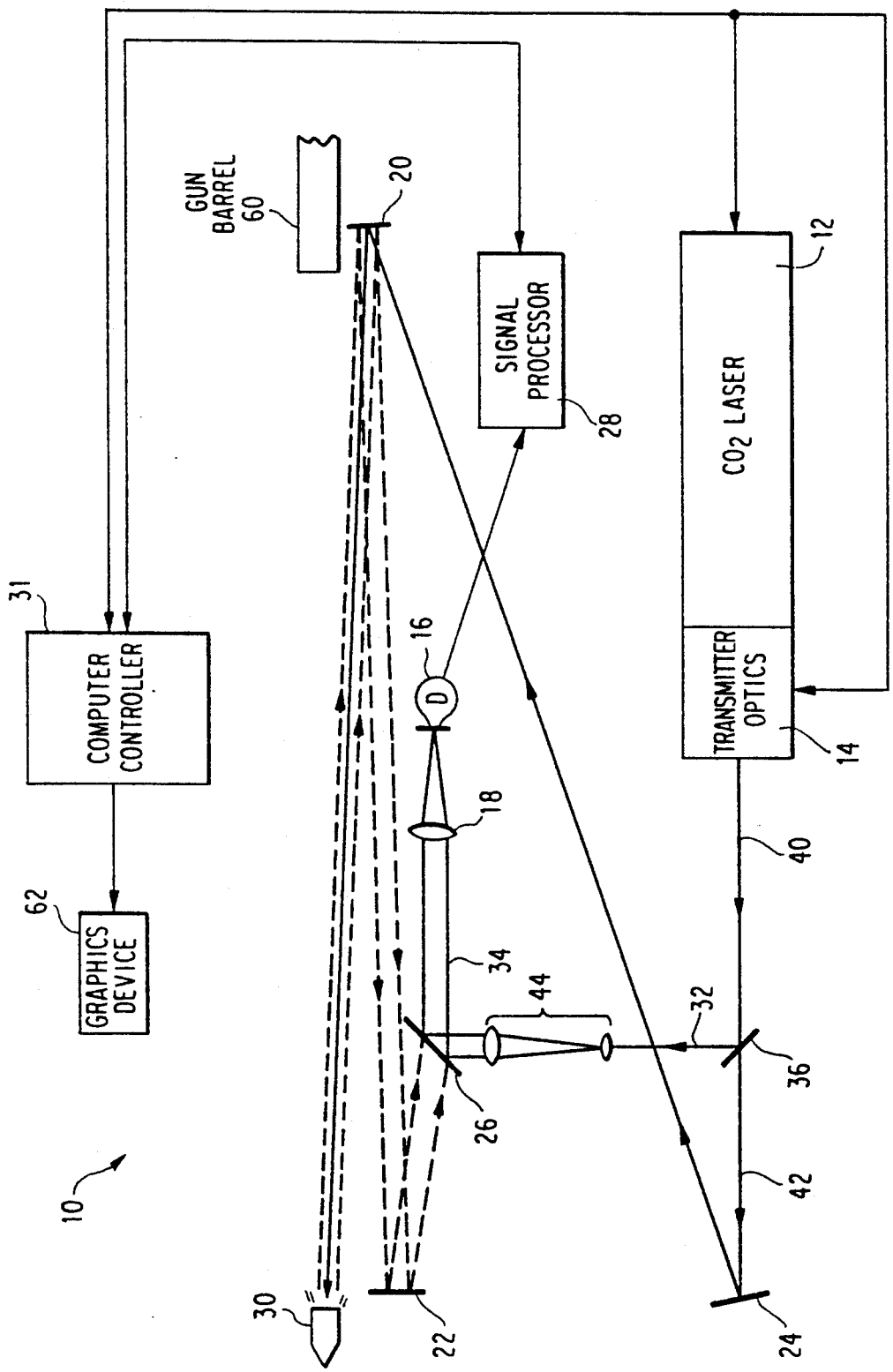
FIG. 1 shows an embodiment of the Laser GAME for making external projectile velocity measurements which consists of a bi-static homodyne laser radar.

In FIG. 1, the main components of the Laser GAME apparatus are set out diagrammatically. The system shown in FIG. 1 employs a bi-static homodyne laser radar. The major components of the Laser GAME, shown generally at 10, include:

a laser source for the transmitter 12;
transmitter optics 14;
laser receiver 16;
receiver optics 18 and 26;
common transmitter/receiver (T/R) optics 20, 22 and 24, where 20 utilizes two plane mirrors on a common support (for example, a post), with one directly above the other and a small bi-static angle between them. The first mirror directs energy onto the projectile (transmission of laser beam to the projectile), and the second mirror collects the reflected energy (receiving leg) and transfers it by some small bi-static angle (with respect to transmitter) to the receiver. This provides the transmit/receive isolation and permits the system to process the received energy continuously. See FIG. 7 for a schematic of the signal processing equipment.

Laser GAME further includes:
a signal processor data buffer 28; a computer controller 31; and a printer/recorder 62.

The preferred embodiment utilizes a coherent CO: laser, such as Laser Photonics Model CL150. The detector must be compatible with the following system requirements. The detector must be sensitive to the wavelengths of operation, possess high electronic bandwidth compatible with the Doppler shift resulting from the projectile velocity and have high quantum efficiency. These requirements are met by photovoltaic detectors fabricated from tertiary mercury cadmium telluride, (Hg:Cd:Te). Detectors made of these materials require operation at cryogenic temperatures (77 degrees Kelvin) to satisfy the above requirements. A cryogenic cooler or other means is required to maintain the infrared detector at its operating temperature.

The Laser GAME system will require primary power from some external sources, for example, some auxiliary power source. If an auxiliary power source is not supplied, the system must have access to some source of AC power.

The major components of the Laser GAME will be described in more detail below.

The laser transmitter 12, transmitter optics 14, receiver 16, receiver optics 18, 26 and the T/R optics 20, 22 and 24 must be mounted such that the alignment and optical performance are not degraded because of the effects of temperature, pressure, vibration, shock, or other external environmental conditions. A protective casing (not shown) is provided so as to seal these sensitive components from the environment, while providing a sturdy housing to maintain the alignment of the optical components. The casing is typically a rigid enclosure constructed from metal or wood covering an optical table or honeycomb structure. The latter incorporates the support and alignment of all Laser GAME optical elements. The enclosure must be provided with openings for the transmitted and reflected beams. Other casing materials may be used without departing from the invention.

It is important that the laser beam is initially aligned with the gun barrel for making internal ballistic measurements, especially for small caliber weapons. Alignment is less critical for larger caliber weapons because the barrel and projectile dimension allow greater tolerance in alignment of the laser beam. The initial alignment may be accomplished by placing a reference object in the trajectory path and aligning the system to get a nominal return. Alternatively, the initial alignment may be maintained by using an inertial, goniometric mount aligned with the gun mount.

For external ballistic measurements, either the entire projectile path may be illuminated by the laser beam, or an appropriate beam steering optical system may be used.

The laser beam transmitter is shown at 12. The laser beam transmitter 12 generates a coherent beam of laser radiation which is well defined spatially, spectrally and temporally. Laser beams may be in either the visible or infrared portions of the spectrum, either pulsed or continuous wave (CW). In the preferred embodiment a CW carbon dioxide laser ($CO_2$) is used, which generates a temporally and spatially coherent beam at 10.6 micron, which is in the infrared portion of the spectrum. It is important that the (laser) wavelength be kept relatively short, as this enables "in situ" barrel measurements of small projectiles, down to 17 caliber (4.32 mm). If longer wavelengths are used, as in the microwave systems, repeated tuning of the source is required. Diffraction effects are created when the wavelength approaches the dimensions of the barrel. This gives rise to waveguide phenomenon which affects the ability to make continuous measurements inside the barrel. Although the 10.6 micron band of the $CO_2$ laser is used in the preferred embodiment, other $CO_2$ wavelengths may be used without departing from the invention. The specific wavelength used is dependent upon a number of factors, such as, projectile dimensions, target reflectivity, atmospheric propagation, the velocity of the object being measured, and the available detectors whose optical and electronic characteristics are compatible with the laser and projectile velocity.

The infrared laser wavelength is able to propagate through the fireball and plasma generated by the burning propellant more than the microwave counterpart, and therefore provides ballistics measurements throughout the greater portion of the projectile flight, both within and outside the gun barrel. Furthermore, as discussed above, the spatial and spectral characteristics of the laser beam minimizes both interference or crosstalk from adjacent sources. Also, the chance of second party detection and disablement (such as by jamming) is minimized because of the spatial distribution of the laser beam, and field of view of the receiver.

The carbon dioxide laser is preferred as the laser transmitter 12 because of its availability, stability, coherence and compatibility with external power sources, and the availability of coherent detectors which possess the necessary bandwidth at the appropriate wavelength needed to detect the Doppler frequency.

Figure 6:
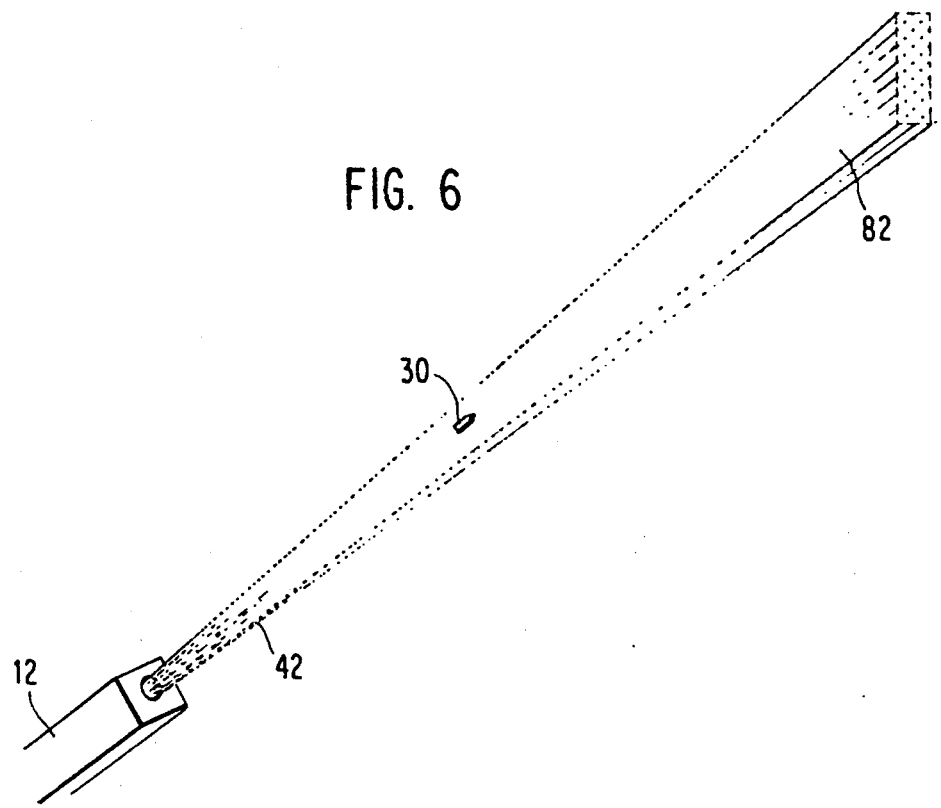
FIG. 6 shows a view including the expansion of the laser beam by a beam expander to illuminate the entire trajectory volume for making short range, direct fire, external ballistics measurements.

The transmit optics 14 are used to alter the beam waist and beam divergence. The laser beam width is modified so as to either illuminate the entire trajectory volume, when associated with short range direct fire ballistics, or to track the projectile during flight, when associated with long range indirect fire ballistics. The particular approach used is dependent upon whether direct fire ballistics or indirect fire ballistics are being measured. For external ballistic direct fire measurement, divergences in the horizontal and vertical axes are tailored to approximate the angular excursion of the ballistic trajectory. For external ballistic indirect fire measurement, the divergences in the horizontal and vertical axes are tailored to facilitate trajectory volume illumination. This is done to minimize the expansion of the laser beam in the horizontal plane (the azimuthal direction with respect to the laser beam), because the ballistic projectile exhibits a smaller cross range excursion. Expansion of the laser beam in the vertical direction (the elevation plane) is necessary to illuminate the entire trajectory volume. FIG. 6 shows the laser beam expansion in the vertical direction for short range, direct fire ballistics measurements external to the gun barrel. This approach conserves laser power and maximizes the laser beam intensity on the projectile during its trajectory in the vertical plane.

For internal ballistics, the divergence requirement is uniform in both axes. However, a columated or slightly convergent beam is desired here. This would equate to the laser beam either being columated or being focused to a point located at or beyond the projectile tip. Therefore, the transmit optics 14 may be slightly modified, if only external ballistic measurements are to be made.

When making both internal and external ballistics measurements, the transmit optics 14 must be chosen so as to adequately meet the conditions for both types of measurements. If a narrow columated beam is provided to facilitate the internal ballistic measurements, then the pointing accuracy requirement for external ballistics measurements may be very stressing. If a broad divergent beam is chosen so as to accommodate external ballistics measurements, then the internal measurements may be degraded by excess background levels. Thus, the beam waist and divergence is chosen so as to balance these factors and provide the optimum signal levels necessary for the operational range. Such balancing is a function of the particular source and optics used, and the system geometry. If only one type of ballistics are needed, the laser beam transmit optics should be tailored to optimize performance for either the internal or external conditions as described above.

The laser receiver 16 used in conjunction with the carbon dioxide laser in the preferred embodiment of the invention is an infrared heterodyne detector, nominally mercury-cadmium-telluride (HgCdTe), with a heterodyne bandwidth (dictated by the projectile maximum velocity) typically under 1 GHz, and a quantum efficiency approaching 0.8. The receiver 16 includes a pre-amplifier (not shown) which is necessary to provide both small signal amplification and match the impedance of the detector to the input impedance of the signal processor 28. The laser receiver 16 includes the necessary cryogen/cooler (not shown) to maintain the detector at its operating temperature (77° K.). Such detectors and the associated cooling systems are well-known to those skilled in the art and commercially available from vendors, such as R.G. Hansen & Associates, Santa Barbara, Calif. or S.A.T. in France. In one preferred embodiment, an S.A.T. Model GPIIP is used as the cooling system.

The receiver optics 18 and 26 include those optics necessary to collect the reflected beam from the target 30, mix it with the local oscillator (L.O.) beam 32 and focus the combined beams 34 onto the detector 16.

Various commercial sources of the lenses, mixing wedges, quarter-wave plates and other optics may be used, such as NRC, Melles Griot, Spindler & Hoyer, II-IV, Inc. or others. The key to optimizing receiver performance is the efficient mixing of the reflected beam with the local oscillator beam 32. This heterodyne mixing is essential for the system to operate effectively.

When optical energy (such as a laser beam) passes through an aperture, diffraction occurs. The receiver optics 18, 26 of the Laser GAME focuses this diffracted energy onto the focal plane. The diffracted energy of a circular aperture, when focused on the detector, appears as a pattern of concentric rings, alternating between high and low intensity. The width of the rings become progressively narrower as they get farther from the center.

The Airy disk is that portion of the pattern which exists between the center of the diffraction pattern and the first minimum in the radial direction. The receiver optics 18, 26 are responsible for focusing the first Airy disk of the mixed beams onto the detector. The receiver optics includes the mixing wedge 26 which transmits the reflected laser beam from the target 30, and reflects the local oscillator beam 32, thus facilitating the mixing function and creating the mixed beam 34. The mixing wedge 26 is a piece of optical material which permits the combination of the transmitted beam from one surface with the reflected beam from a second surface. In this embodiment of the Laser GAME, the received beam is transmitted through the wedge 26, and the local oscillator is reflected by the wedge 26. The wedge permits this combination while all other combinations are shunted out of the primary optical path. The mixing wedge is transmissive at the wavelength of interest, by utilizing an anti-reflective coated surface for the received beam, and by utilizing the fresnel reflection coefficient for the local oscillator on the reflected beam. The local oscillator beam 32 is created when the laser radiation 40 transmitted from the laser source 12 is split by a germanium flat beam splitter 36, wherein a fraction of the laser radiation 40 is split out of the main beam to produce the local oscillator beam 32. The remainder of the laser radiation 40 is transmitted through the beam splitter 36, becoming the transmitted laser beam 42, which is transmitted to the target 30. The local oscillator beam 32 is expanded by a 6X expander 44 made from zinc selinide for a 10.6 micron wavelength beam. Other materials may be used for making beam expanders for different wavelengths. Such beam expanders are know to those skilled in the art. The mixed beams 34 result in the heterodyne signal which is transferred and focused onto the detector 16 via imaging lens 18.

Figure 2:
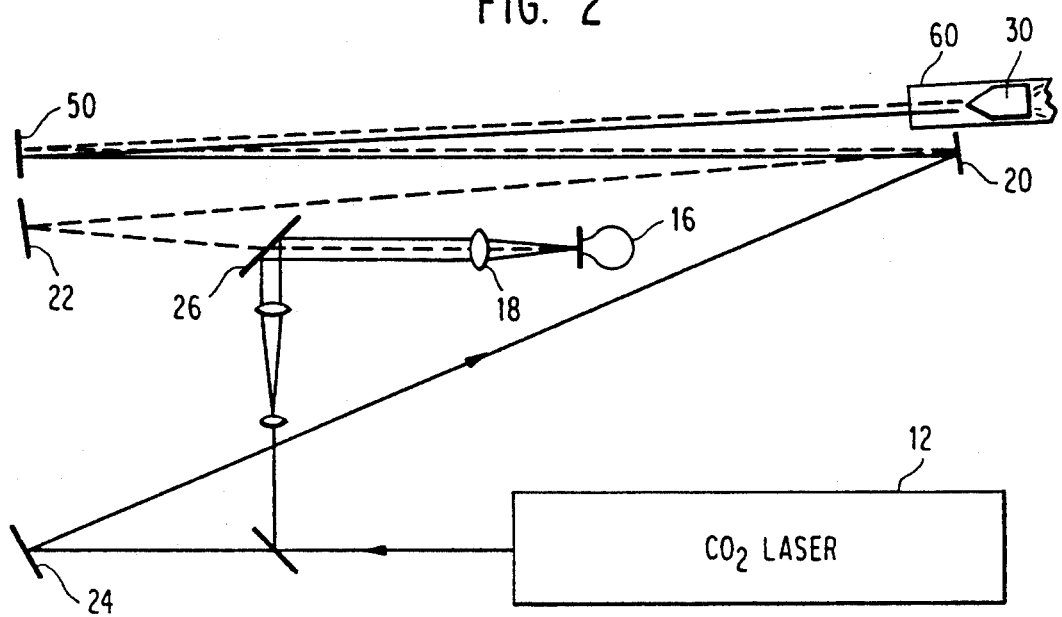
FIG. 2 shows an embodiment of the Laser GAME for making internal projectile velocity measurements.
Figure 3:
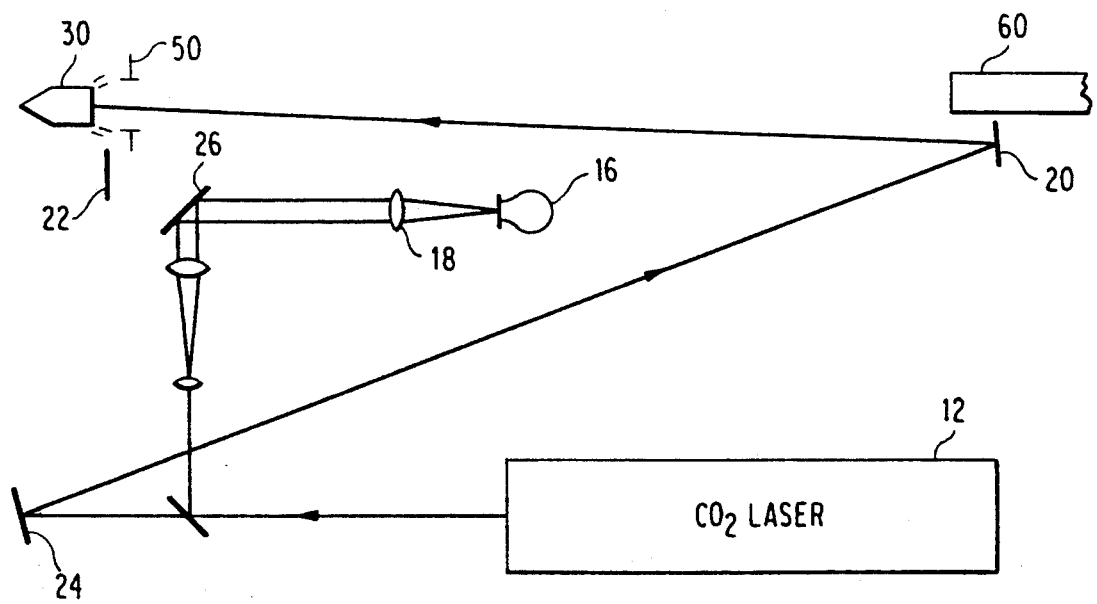
FIG. 3 shows the embodiment of FIG. 2 after the projectile has penetrated the sacrificial mirror, thus automatically transforming the apparatus to one for making external projectile velocity measurements on the same projectile.

FIGS. 2 and 3 show one embodiment of the Laser GAME in more detail. This system is also a bi-static homodyne laser radar system, wherein reference number 20 represents two mirrors mounted on a post with a small bi-static angle between them, as described above with reference to FIG. 1.

One option for the T/R optics may be the use of common optics to relay the return beam to the receiver, including the polarization rotation elements (not shown) necessary to isolate and separate the receiver beam from the transmit beam. Such elements are known to those skilled in the art. The design and installation of the T/R optics must be done so as not to alter the phase front of either the transmitted or the returned beam.

The transmitter/receiver (T/R) optics includes mirrors 20, 22 and 24 which project the shaped laser beam 42 into the volume containing the projectile trajectory. The T/R optics are only slightly different for internal ballistics measurements (versus the external ballistics measurements). For internal ballistics measurements, a sacrificial mirror 50 is used, as shown in FIGS. 2 and 3, wherein the sacrificial mirror 50 relays the transmit beam down the gun barrel 60 from the muzzle to the projectile 30. In one preferred embodiment of the Laser GAME a metalized microscope slide is used as the sacrificial mirror 50. These slides are electronically cleaned and coated with aluminum or gold in a vacuum stand. The sacrificial mirror 50 relays the reflected beam from the projectile 30 back to the Laser GAME receiver 16. The sacrificial mirror 50 operates up until the time that the projectile 30 collides with and destroys it, as shown in FIG. 3, hence the term "sacrificial". The sacrificial mirror 50 is located downstream from the gun barrel muzzle. This provides a transition region for internal to external ballistics measurements and also minimizes the effect of the blast and debris on the sacrificial mirror 50 and its associated mount. The sacrificial mirrors 50 are easy to replace, requiring less than a minute for replacement, assuming the alignment and structure of the mount has not been altered. If the sacrificial mirror mount has been damaged or altered, longer times may be needed to re-establish alignment.

For direct fire external ballistic measurements, the T/R optics provide for directing the outgoing laser beam into the trajectory volume, and for collecting the reflected (return) beam back to the laser receiver 16. The T/R optics may also include provision for steering the beam utilizing a closed loop tracker for those cases which require that the laser beam continuously track the projectile during its trajectory. A beam steering system is necessary for the long range, indirect fire ballistics, wherein the projectile follows a parabolic path. There may be some benefit in using the beam steering mount for some of the long range direct fire measurements, wherein the gun is aimed directly at the target, although this is usually not necessary for short range direct fire tests.

For external ballistics, the mirror shown at 20 is comprised of two mirrors stacked one atop of the other on a post. One mirror is used to project the transmitted light to the projectile 30. The transmit beam is shown by the solid lines in the Figures. The other mirror located at 20 is used to direct the return beam (dashed lines in FIGS. 1 and 2) to the mirror 22 for mixing with the local oscillator beam 32.

As discussed above relating to FIGS. 2 and 3, the Laser GAME measures internal ballistics through the use of the "one time" sacrificial mirror 50 located in the ballistic path downstream of the gun muzzle. The relative positioning of the sacrificial mirror 50, the laser transmitter 12, and the weapon 70 is shown more specifically in FIG. 4. In the preferred embodiment, the sacrificial mirror 50 is supported separate from the remaining optical elements of the Laser GAME, to prevent energy transfer from the blast to the optical train or optical components of the system. The sacrificial mirror 50 is small in size and mass, therefore its support mechanism is not a stressing item.

Figure 4:
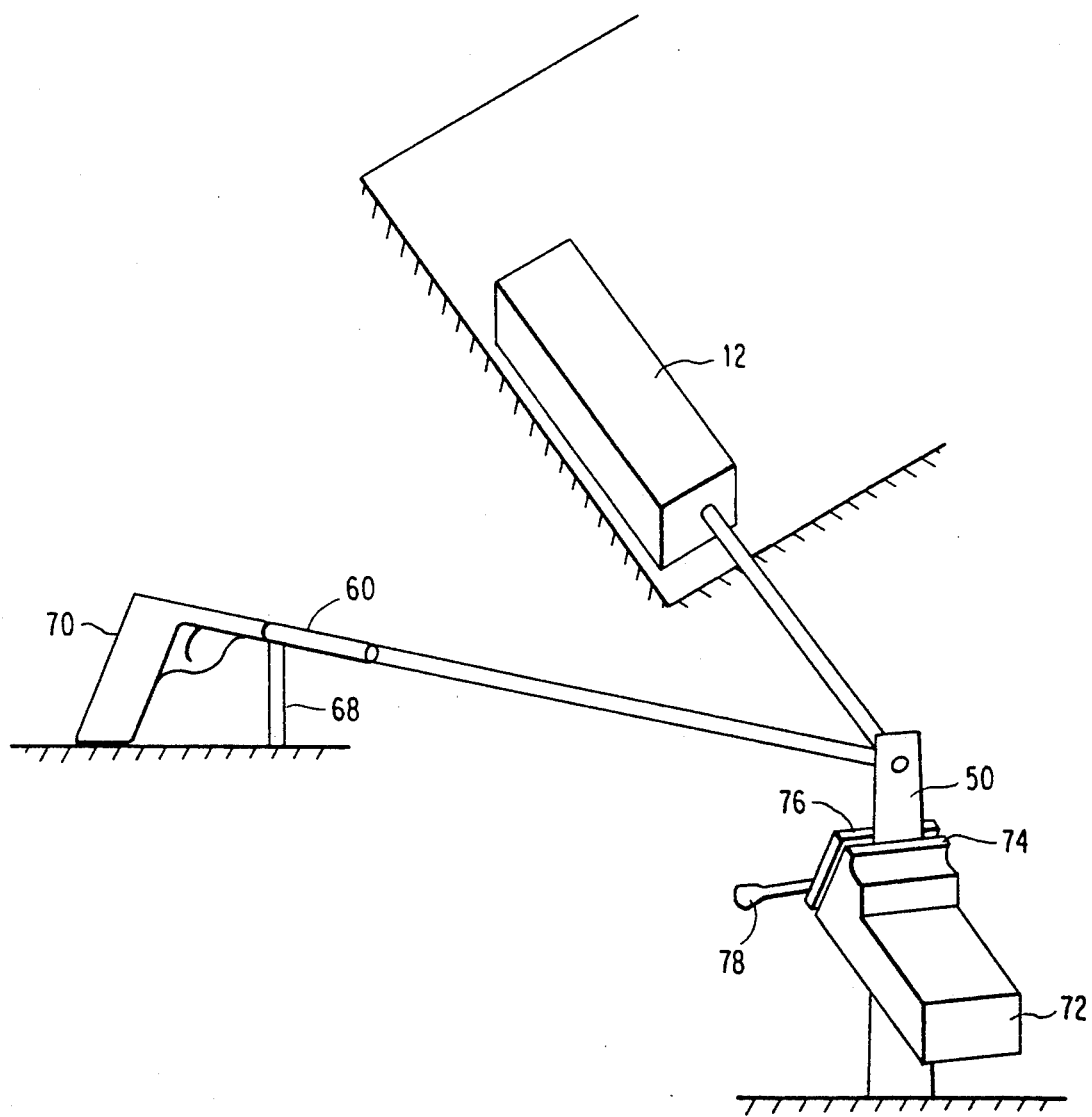
FIG. 4 shows an overview of one embodiment of the Laser GAME system for conducting measurements internal to the barrel.

FIG. 4 illustrates the simple manner in which the sacrificial mirror may be replaced. The sacrificial mirror 50 is mounted on a means for mounting, for example, between the jaws 74 and 76 of a vise 72, such as a bench vise. Other sacrificial mirror mounting means may be used without departing from the invention. The vise 72 is located so as to place the sacrificial mirror 50 in the path of the projectile. After the projectile destroys the sacrificial mirror 50, the spent mirror may be removed by loosening the jaws 74 and 76 by rotating the handle 78, and a new sacrificial mirror 50 is located in the projectile path. Realignment should not be necessary, as long as the relative positions of the laser 12, vise 72 and gun 70 are not disturbed by the firing of the gun. In the embodiment of FIG. 4, the gun barrel 60 is rigidly held in place by a clamping means 68 to guarantee repeatability in its translation and orientation.

In the embodiment of FIG. 4, the laser 12, gun 70 and the sacrificial mirror mounting means are located independent from one another; however, it is possible to permanently mount either the laser or sacrificial mirror mounting means or both onto the weapon. Furthermore, the laser beam and mirror mounting means may be mounted together, but separate from or detachable from the weapon.

Figure 5:
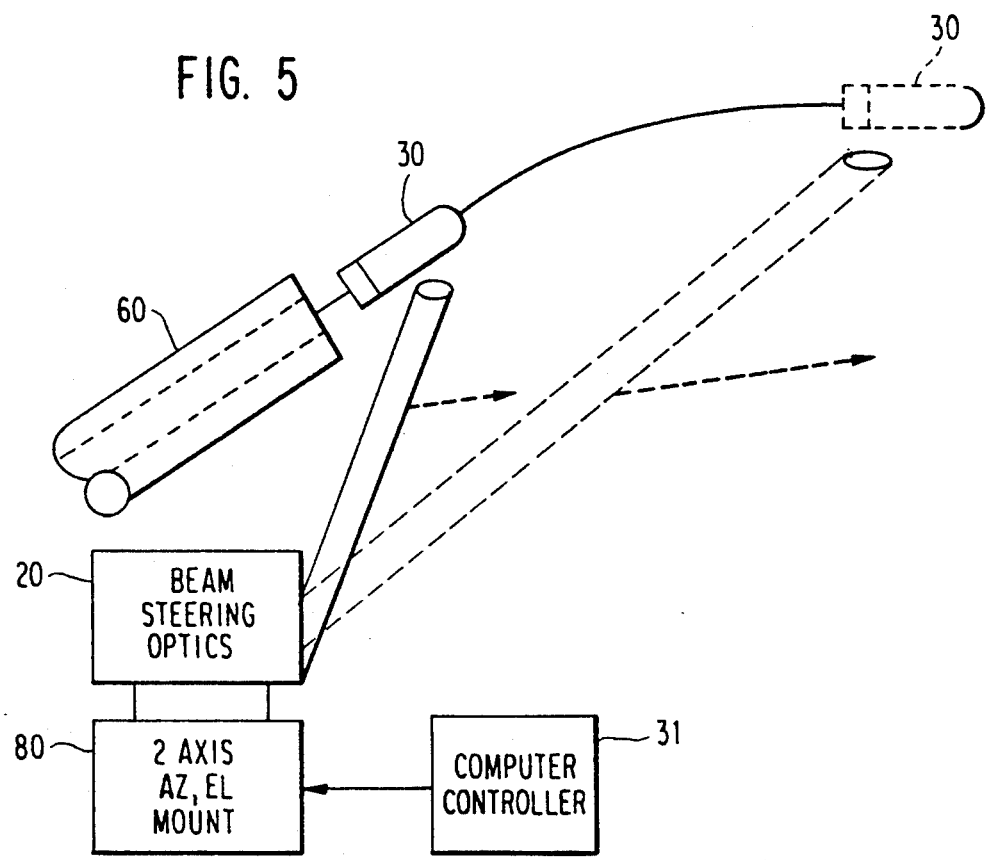
FIG. 5 shows a schematic view of the beam steering apparatus used to make external ballistic measurements where the projectile is tracked during its trajectory.

After the projectile destroys the sacrificial mirror 50, the optical system is automatically set up to continue ballistic measurements throughout the projectile flight path. This feature enables the measurement of ballistic velocity from V=0 through $V_{max}$ at the muzzle, and then on to some convenient point down range, where the sacrificial mirror 50 is located. External ballistics utilizes mirrors which project the laser beam down range, illuminating the ballistics trajectory. For short range direct fire ballistics, Laser GAME can be configured with fixed optics so that the incident laser beam 42 illuminates the entire trajectory volume 82 of direct fire ballistics as shown in FIG. 6. For the indirect fire and those ballistics which traverse a more pronounced parabolic trajectory, Laser GAME beam steering mirror, 20 can be fitted onto a computer controlled beam steering mirror mount 80, as shown schematically in FIG. 5. Such beam steering mirrors and mounts are known in the art and commercially available, such as EL/AZ Direct Drive Positioners Model #203315 and 203243 available from Tecom Industries, Inc. The beam steering mirror mount 80 uses pointing information, derived from a quadrant detector and the receiver signal processor, to steer the laser beam in the azimuthal and elevation directions so as to continuously track and illuminate the projectile during flight.

The signal processor 28 receives the output signal from detector 16 and consists of the electronics needed to process the Doppler frequencies detected by the heterodyne detector 16, and amplified by the laser detector pre-amplifier. Various signal processing means may be used, depending on the format and fidelity required by the user. Therefore, it is deemed unnecessary to describe the counters and control and transfer circuits of the signal processor in great detail, since it is possible to use quite elementary signal processing systems or quite complex signal processing systems. It is believed that a person skilled in this art will be able to determine the appropriate signal processing to work in accordance with the principles disclosed herein.

The signal processor used in accordance with one embodiment of this invention is an analog to digital device which converts the analog Doppler signals to a digital data stream. The signal processor accomplished this by means of a Fourier Transform (FT). The FT provides an instantaneous spectral analysis of the analog signals. The digital data is directly converted to velocity with respect to an inertial frame. The signal processing technique is described in more detail below.

The Laser GAME utilizes a heterodyne receiver to detect the laser radiation reflected from the target (projectile). Using a local oscillator as a reference, the received signal is compared to the local oscillator frequency by mixing the two optical beams. The mixed beams are imaged onto a detector. The receiver permits the detection of the difference (or beat frequency) between the two optical frequencies. This beat frequency is typically referred to as the Doppler frequency, and it provides a linear measure of the projectile's velocity. The ratio of the Doppler frequency to the local oscillator frequency is then used to calculate the projectile's velocity. The equation which represents this relationship is:

$$v = \frac{f(d) \times c}{2 \times f(o)}$$

wherein:
v is the velocity,
f(d) is the doppler frequency,
c is the velocity of light on the medium
f(o) is the local oscillator (reference laser) frequency.
When using Laser GAME, the projectile velocity is changing with time, and the Doppler frequency observed at the detector is also changing with time. As a result, the Doppler frequencies are sampled over time intervals which are small with respect to the event. The signal processor provides a means of processing the Doppler frequency in real time within the constraints of detector bandwidth and event time. Typical signal processor specifications include a sample time in the range of about 1-20 microseconds; a bandwidth in the range of about 500 MHz to 1.8 GHz; and a dynamic range greater than about 60 dB. The Doppler signals are processed to obtain projectile velocity.

By either differentiating or integrating the velocity data with the appropriate electronic or software means, the data processor can generate acceleration or position data, respectively. In addition, the computer controller 31 provides various other system functions which enable the control of the transmitter, execution of the built in self test (BIT) diagnostics, auto-calibration, processing of signal formatting of the output data and controlling the beam steering mirror (when required) to point and track the projectile. The computer controls the signal processor data buffer 28 which provides temporary on-line storage of the processed signal. This data buffer is necessary since the signals from the receiver/signal processor will be processed more rapidly than any graphics device (62, see FIG. 1) can reproduce the results. Suitable graphics devices include video monitors, such as CGA, EGA and VGA; printers, such as a Panasonic KX-P1124 or a Hewlett Packard HP-7475A.

A common path laser radar system is shown in FIGS. 7 and 8. The common path homodyne system includes polarizing and polarization rotation elements integrated in the optical train to isolate the transmitted beam from the received beam and vice versa. These polarizing and polarization rotation elements are commercially available and well known to those skilled in the art.

A common path heterodyne laser radar system may also be implemented using the polarizing and polarization rotation components for isolation of the transmitted and received beam. The common path heterodyne system requires the frequency of the local oscillator to be offset from the frequency of the transmitted beam.

All of the other functions and performance of the Laser GAME are the same for the common path systems as the bi-static homodyne systems described above. FIG. 7 further shows a schematic diagram of the overall Laser GAME system.

Laser GAME harnesses the laser radar technology to improve the state of the art in ballistic measurements, among these improvements are:

a. the use of laser radar for making conventional gun ballistic measurements;
b. the measurement of ballistics position, velocity and acceleration inside the gun barrel in both large and small caliber weapons;
c. improved fidelity of external ballistic measurement:
   1. including measurement nearer to the muzzle than previously possible, due to improved visibility through the fire ball and plasma, and
   2. higher rate of measurement with improved accuracy, approximately tens of cm/sec at the present sampling rate;
d. this technique is not limited to measurement of large caliber weapons, but rather, the measurement of ballistics down to as small as 17 caliber is possible; and
e. the use of this system as a diagnostic tool for weapon developers, and to provide a quality control tool for both weapon and ammunition producers.

Laser GAME will give the weapon developer or user the ability to conduct repeatability and failure analysis of ammunition and weapons. Inasmuch as small changes in gun performance can be monitored, the useful life of the weapon or ammunition can be determined. In this way defective equipment can be identified or diagnosed, thus improving the development of such weapons.

While the invention has been described in conjunction with particular embodiments, various modifications may be made without departing from the invention as defined in the attached claims. Furthermore, the invention may be used to measure the velocity of moving objects other than weapon projectiles, such as automobiles, baseballs or the like.

I claim:

1. An apparatus for measuring the velocity of an object in a target area by measuring a Doppler frequency shift of laser radiation reflected from the target area, said apparatus comprising:
   a laser source for generating a coherent laser beam;
   transmitting optics means to modify the laser beam with respect to divergence and spatial structure;
   transmitter/receiver optics means arranged so as to direct the transmitted laser beam onto the target area and to receive a portion of the laser beam reflected from said target area;
   means for providing a local oscillator beam;
   receiving optics means to mix the reflected laser beam with the local oscillator beam;
   means for focusing the mixed beams;
   a receiver means for detecting the focused, mixed beams and generating a detection signal; and
   a signal processing means for processing the detection signal generated by said receiver means so as to produce velocity information based on the Doppler frequency shift of the reflected laser beam, and wherein the object is a projectile and the target area is within a barrel of a gun such that the velocity of the projectile while travelling in the gun barrel is measurable.

2. An apparatus according to claim 1, wherein said transmitter/receiver optics means further includes a sacrificial mirror for directing the laser beam down the gun barrel, and returning the reflected laser beam to the receiver optics, said sacrificial mirror being located in the path of the projectile.

3. An apparatus according to claim 1, wherein the laser beam illuminates the target area outside of a barrel of a gun, along the path of a projectile, whereby the velocity of the projectile is measured.

4. An apparatus according to claim 1, further including a computer controller and beam steering optics for pointing the laser beam onto the object.

5. An apparatus according to claim 4, further including beam steering mirrors for tracking the object.

6. An apparatus according to claim 4, wherein said computer controller further includes a built in self test diagnostic means.

7. An apparatus according to claim 1, wherein said transmitter/receiver optics means are used to direct and receive the coherent transmitted and reflected laser beams.

8. An apparatus according to claim 1, wherein said detector means includes a mercury-cadmium-telluride (HgCdTe) optical detector for converting the received optical energy to an electronic signal.

9. An apparatus according to claim 8, wherein said mercury-cadmium-telluride optical detector has a satisfactory optical response and electronic bandwidth capable of detecting the mixed Doppler frequency shifted carrier and the local oscillator.

10. An apparatus according to claim 8, further including a cyrogenic cooling means to maintain the detector at an appropriate operating temperature.

11. An apparatus according to claim 1, further including a pre-amplifier to provide small signal gain and to match the impedance of the detector means to the input impedance of the signal processing means.

12. An apparatus according to claim 1, wherein said laser source provides temporally and spatially coherent beam compatible with velocity measurement.

13. An apparatus according to claim 1, further including means for integrating the velocity information so as to produce information on the position of the object.

14. An apparatus according to claim 13, further including means for differentiating the velocity information so as to produce information on the instantaneous acceleration of said object.

15. An apparatus according to claim 1, further including means for differentiating the velocity information so as to produce information on the instantaneous acceleration of said object.

16. An apparatus according to claim 1, wherein the object is a projectile, and ballistic measurements both internal and external to a gun barrel may be made on the same projectile.

17. An apparatus according to claim 1, wherein said laser source emits radiation at infrared wavelengths.

18. An apparatus according to claim 17, wherein said laser source is a carbon dioxide laser.

19. An apparatus according to claim 18, wherein said infrared wavelength is approximately 10.6 microns.

20. An apparatus for measuring the velocity of an object, comprising:
   a laser source for generating a coherent laser beam;

means for illuminating the object whose velocity is to be measured with the laser beam, thereby reflecting said laser beam from the object whose velocity is to be measured;

means for detecting and measuring a Doppler frequency shift of the reflected laser beam; and means for determining the velocity of the object from the measured Doppler frequency shift, and wherein the object is a projectile which travels in a barrel of a gun and wherein said means for illuminating illuminates the projectile while travelling within the barrel of the gun.

21. An apparatus according to claim 20, wherein the laser source is a carbon dioxide laser.

22. An apparatus according to claim 20, wherein the means for detecting and measuring includes a mercury-cadmium-telluride (HgCdTe) detector.

23. An apparatus according to claim 20, further comprising a means for integrating the measured velocity, so as to produce information on the position of the object.

24. An apparatus according to claim 23, further comprising a means for differentiating the measured velocity, so as to produce information on the acceleration of the object.

25. An apparatus according to claim 20, further comprising a means for differentiating the measured velocity, so as to produce, information on the acceleration of the object.

26. An apparatus according to claim 20, wherein for the case of a direct fire ballistic measurement, said laser source illuminates essentially the entire path of the object.

27. An apparatus according to claim 20, further comprising a beam steering mirror, wherein for the case of an indirect fire ballistic measurement, the beam steering mirror is used to track the movement of the object.

28. An apparatus according to claim 20, wherein said means for detecting and measuring includes a means for providing a reference oscillator beam and means for mixing the reflected laser beam with the reference local oscillator beam, and further including means for focusing the mixed beams onto a detector.

29. An apparatus according to claim 28, wherein said means for mixing includes a beam splitter and a mixing wedge, whereby the reference local oscillator beam is split away from the laser beam by the beam splitter, before the laser beam is reflected from the object.

30. An apparatus according to claim 29, wherein the beam splitter is a germanium flat.

31. A method of measuring the velocity of an object by measuring a Doppler frequency shift of laser radiation reflected from the object, comprising:

(a) illuminating a trajectory volume with laser radiation;

(b) passing the object whose velocity is to be measured through said trajectory volume, whereby said laser radiation is reflected off said object;

(c) receiving said reflected radiation;

(d) providing a reference local oscillator beam;

(e) measuring the Doppler frequency shift of the reflected radiation by comparing the reflected laser radiation frequency to the reference local oscillator beam; and (f) determining the velocity of the object from the measured Doppler frequency shift, and wherein at least a portion of the trajectory volume is within a gun barrel and wherein the illumination step includes illuminating the portion of the trajectory volume which is in the gun barrel.

32. The method according to claim 31, wherein the portion of the trajectory volume within the gun barrel is illuminated by directing the laser radiation into a muzzle of the gun barrel, by a sacrificial mirror.

33. The method according to claim 31, wherein a portion of the trajectory volume is external to a gun barrel, and the object whose velocity is being measured is a projectile fired from the gun barrel.

34. The method according to claim 33, wherein the a portion of the trajectory volume external of the gun barrel is illuminated by expanding the laser radiation so as to illuminate the entire trajectory volume external of the gun barrel.

35. The method according to claim 33, wherein the portion of the trajectory volume external to the gun barrel is illuminated by using a beam steering mirror to track the projectile after it has been fired from the gun barrel.

36. The method according to claim 31, wherein the reference local oscillator beam is created by splitting off a portion of the laser radiation before the radiation is reflected from the object.

37. The method according to claim 36, wherein the measuring step includes mixing the local oscillator beam and the reflected beam with a mixing wedge, and passing the mixed beams to a heterodyne detector.

38. The method according to claim 37, wherein the velocity is determined from the following relationship;

$$v = \frac{f(d) \times c}{2 \times f(o)}$$

wherein
v is the object velocity;
f(d) is the measured Doppler frequency;
f(o) is the local oscillator frequency; and
c is the velocity of light.

39. The method according to claim 31, wherein the object is a projectile fired from a gun barrel, wherein the illumination step includes illuminating the trajectory volume such that velocity measurements may be made on the projectile while it is within the gun barrel and after it exits the gun barrel.

40. The method according to claim 39, wherein the illuminating step includes;

(a)(1) providing a sacrificial mirror within the path of the projectile; and (a)(2) reflecting the laser radiation from the sacrificial mirror down the gun barrel, so as to enable velocity measurements while the projectile is within the gun barrel and immediately after it exits said barrel.

41. The method according to claim 40, wherein the projectile destroys the sacrificial mirror by penetrating though said mirror, and the illumination step further includes the step of:

(a)(3) illuminating a trajectory volume external to the gun barrel, such that laser radiation is reflected from the projectile after it penetrates said sacrificial mirror.

42. The method according to claim 41, wherein step (a)(3) includes the use of a beam steering mirror to track the projectile after it penetrates the sacrificial mirror.

43. The method according to claim 41, wherein step (a)(3) includes illumination of the entire trajectory volume, such that it is not necessary to track the projectile after it penetrates the sacrificial mirror.

44. The method according to claim 31, further comprising the step of:
(f) differentiating the determined velocity so as to provide information on the acceleration of the object.

45. The method according to claim 44, further comprising the step of:
(g) integrating the determined velocity so as to provide information on the position of the object.

46. The method according to claim 31, further comprising the step of:
(f) integrating the determined velocity so as to provide information on the position of the object.

47. An apparatus according to claim 1 wherein said laser source generates a continuous laser beam.

48. An apparatus according to claim 1 wherein said transmitter/receiver means directs the transmitted laser into the gun barrel and along a flight path of the projectile that originates at the exit point from the gun barrel.

49. An apparatus according to claim 20 wherein said laser source generates a continuous laser beam.

50. An apparatus according to claim 20 wherein said laser source is an infrared laser source.

51. An apparatus according to claim 31 wherein said illuminating the trajectory volume with laser radiation includes transmitting a continuous laser beam.

52. An apparatus for measuring the velocity of a projectile in a target area by measuring a Doppler frequency shift of laser radiation reflected from the target area, said apparatus comprising:
a laser source for generating a coherent laser beam;
transmitting optics means to modify the laser beam with respect to divergence and spatial structure and to transmit a continuous wave laser beam;
transmitter/receiver optics means arranged so as to direct the transmitted laser beam onto the target area and to receive a portion of the laser beam reflected from said target area, said target area including an external projectile path which originates at an exiting point of the projectile from a gun barrel, and said transmitter/receiver optics means being dimensioned and arranged so as to illuminate the projectile with said continuous wave laser beam over the entire external projectile path;
means for providing a local oscillator beam;
receiving optics means to mix the reflected laser beam with the local oscillator beam;
means for focusing the mixed beams;
a receiver means for detecting the focused, mixed beams and generating a detection signal; and
a signal processing means for processing the detection signal generated by said receiver so as to produce velocity information based on the Doppler frequency shift of the reflected laser beam.

53. An apparatus as recited in claim 52 wherein said transmitter/receiver optics means directs said continuous wave laser so as to diverge outwardly upon exiting said transmitter/receiver optics means and along the external projectile path.

54. An apparatus as recited in claim 53 wherein, for the case of a direct fire ballistic measurement of the projectile, said continuous wave laser beam is fixed and illuminates essentially the entire external path of the projectile.

55. An apparatus as recited in claim 52 wherein said target area includes an internal projectile path which originates inside the gun barrel, and said transmitter/receiver optics means directs said continuous beam both into the internal projectile path and into the external projectile path.

56. A method for measuring the velocity of a projectile in a target area by measuring a Doppler frequency shift of laser radiation reflected from the target area, said method comprising:
transmitting a coherent and continuous wave laser beam;
directing the continuous wave laser beam onto the target area so as to receive a portion of the laser beam reflected from the target area, said target area including an external projectile path which originates at an exiting point of the projectile from a gun barrel and extends to one end of said target area, and wherein the directing of the transmitted laser beam includes illuminating the projectile with said continuous wave laser beam over the entire external projectile path;
providing a local oscillator beam;
mixing the reflected laser beam with the local oscillator beam;
focusing the mixed beams;
detecting the focused, mixed beams and generating a detection signal; and
processing the detection signal generated by said receiver so as to produce velocity information based on the Doppler frequency shift of the reflected laser beam.

57. A method as recited in claim 56 wherein said directing of said laser beams includes directing said laser beam so as to diverge said laser beam from the origin of transmission outward into said external projectile path.

58. A method as recited in claim 56 wherein, for the case of a direct fire ballistic measurement of the projectile, said continuous wave laser beam is fixed and directed so as to illuminate essentially the entire external path of the projectile.

59. A method as recited in claim 56 wherein said target area originates inside the gun barrel and said laser beam is directed both inside the gun barrel and into the external projectile path.

* * * * *